Figure 1:
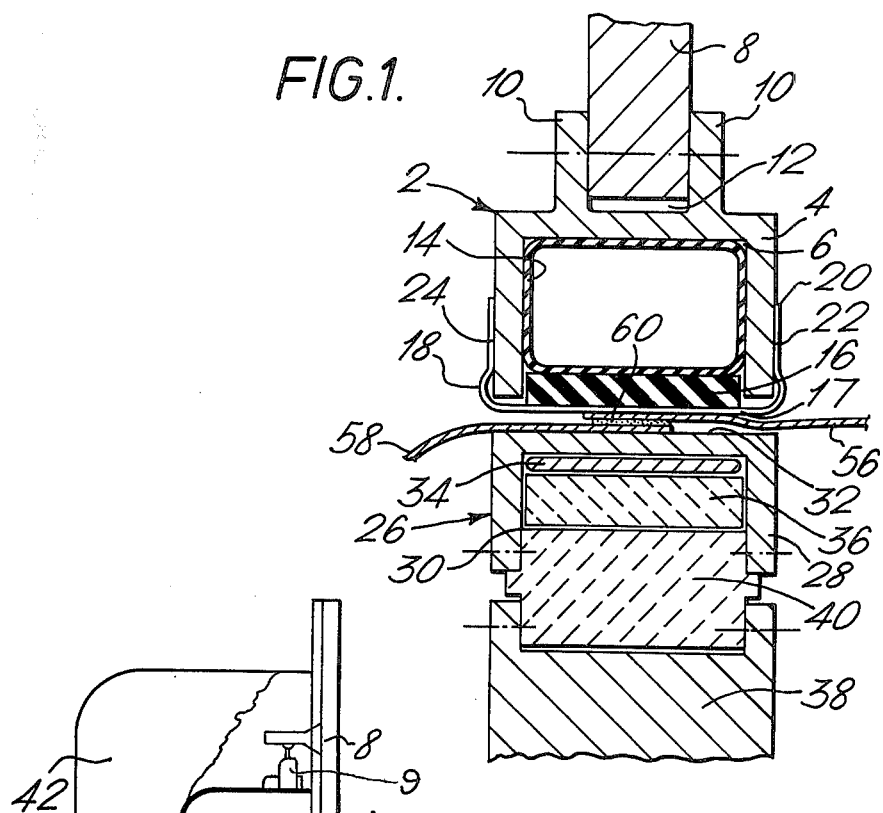

United States Patent [19]
Clements et al.

[11] 4,193,341
[45] Mar. 18, 1980

[54] PRESSES

[75] Inventors: Harold J. Clements, Canterbury; Frank Ely, Ashford, both of England

[73] Assignee: Modern Precision Engineers & Associates Limited, Ashford, England

[21] Appl. No.: 29,047

[22] Filed: Apr. 11, 1979

Related U.S. Application Data

[63] Continuation of Ser. No. 848,191, Nov. 3, 1977, abandoned.

[51] Int. Cl.$^2$ ............................................. B30B 15/34
[52] U.S. Cl. .................................. 100/93 P; 100/211; 100/231; 100/269 A
[58] Field of Search ................ 100/93 P, 269 A, 211, 100/231, 295; 425/389, 390, DIG. 13

[56] References Cited

U.S. PATENT DOCUMENTS

| 2,869,173 | 1/1959 | Van Hartesveldt | 100/269 A |
| 3,478,909 | 11/1969 | Charles | 100/269 A |
| 3,808,968 | 5/1974 | Notin | 100/269 A |

FOREIGN PATENT DOCUMENTS 127886 6/1948 Australia ............................. 100/269 A Primary Examiner—Billy J. Wilhite
Attorney, Agent, or Firm—Bacon & Thomas

[57] ABSTRACT

A platen for a press comprises a housing having a recess therein, an inflatable member being received in the recess. When the inflatable member is inflated, it acts as a pressure applying member. The press may be provided with one or two such platens.

10 Claims, 2 Drawing Figures

U.S. Patent

Mar. 18, 1980

4,193,341

PRESSES

This is a continuation of application Ser. No. 848,191, filed Nov. 3, 1977, now abandoned.

The present invention relates to a platen for a press, and to the press, for example, a vulcanizing press.

Vulcanization processes may be used to join members made of rubber or rubber-like material. For example, to join two sheets of rubber or rubber-like material the adjacent edges thereof are first overlapped with a thin layer of uncured tape interposed therebetween to form a laminated joint area. The tape is of a material which is compatible with and of the same generic character as the material of the sheets to be joined. The joint area is then placed between the pre-heated platens of a press and heat and pressure is applied thereto to cure the tape and thereby form a homogeneous adhesive bond between the edges of the sheet.

It is usual, when joining sheets by the process outlined above, to employ a conventional press which includes two relatively movable, rigid, heated platens which can be brought together to apply heat and pressure to the laminated joint area disposed therebetween.

In cases where the joint areas are relatively long, for example, where large sheets are to be produced, it is advantageous to employ presses having correspondingly long platens so that the vulcanization process may be completed conveniently and economically. However, this is not always possible because of the practical limitations of conventional presses. For example, presses having platens of rigid construction are only capable of imparting uniform pressures to a workpiece disposed between the platens when the pressure applying surfaces of the platens are truly parallel with respect to one another and when the area of workpiece to be pressed has a substantially uniform thickness throughout. In addition, conventional presses incorporate mechanical linkages to translate the power of hydraulic or pneumatic actuators into the actual closing force of the platens and this may make it difficult to ascertain the actual pressure applied by the platens, and therefore to accurately control the pressure applied. Further, as the platens only apply pressure when the two platens are moved towards one another, such conventional presses are generally only suitable for use in forming sheet material by the process outlined above when the laminated joint area lies in a plane disposed substantially normally to the direction of movement of the platens.

It is an object of the present invention to provide a platen for a press which, when incorporated in a press, will reduce some or all of the problems set out above.

According to the present invention there is provided a platen for a press, the platen comprising a housing having a recess defined therein and an inflatable member received within said recess, said inflatable member being arranged to act as a pressure applying member upon inflation thereof.

In a preferred embodiment of the invention the housing is an elongate member and the recess is a substantially U-shaped channel extending over the full length of the elongate member. The inflatable member is an inflatable tubular member preferably made of rubber. A pressure transmitting member is retained in the opening of the channel and has a pressure applying surface. The pressure transmitting member is arranged to be acted upon by the inflatable member upon inflation thereof. Preferably said pressure transmitting member is a strip of flexible material having a planar pressure applying surface which extends for the full length of said channel and has a width substantially equal to or slightly less than the width of the opening of the channel. The said strip is retained in the opening of the channel by way of a skirt, preferably of flexible material, the longitudinal edges of which are secured to the longitudinally extending sides of said elongate member such that said skirt extends across the opening of said channel.

The invention also extends to a press comprising first and second platens mounted to define a working gap therebetween, at least said first platen being as defined hereinbefore, and means for inflating the inflatable member of the or each platen.

Preferably, said means for inflating the inflatable member comprises a source of compressed air and a regulating valve for said source. Upon inflation thereof said inflatable member substantially fills said channel.

In a preferred embodiment the two platens are movable relative to one another. Preferably the platens are supported by a frame and said first platen is movable relative to said frame and said second platen is fixed relative to the frame.

In an embodiment of the invention said fixed platen comprises an elongate member defining a pressing surface and having a recess defined therein receiving a heating element.

Figure 2:
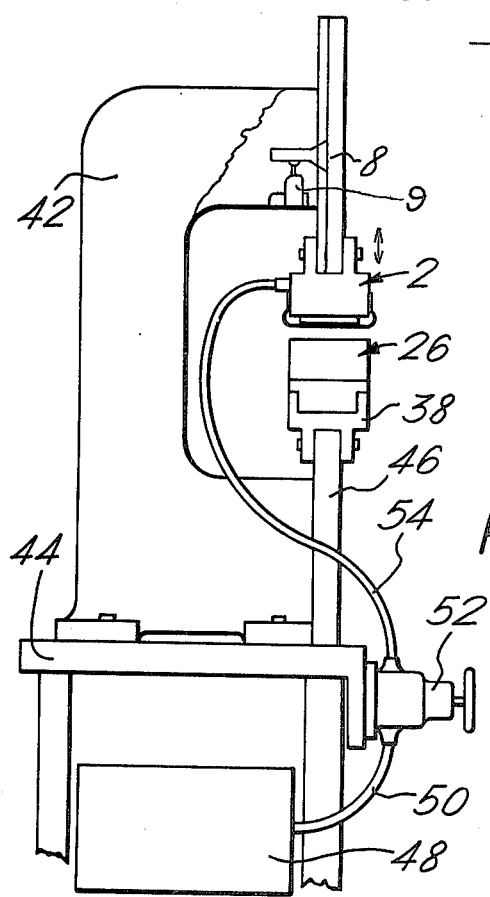

An embodiment of the present invention will hereinafter be described, by way of example, with reference to the accompanying drawings, in which:

FIG. 1 shows in section an end elevation of a platen arrangement for a press including a platen of the invention, and FIG. 2 shows an end elevation of a press including the platen arrangement of FIG. 1.

The platen arrangement shown in FIG. 1 includes a first, upper, movable platen 2 which has a substantially rigid, metallic, elongate housing member 4. A U-shaped channel 6 is formed in the lower surface of the member 4 and extends over the full length of the member 4. The housing member 4 is secured to an elongate upper movable member or ram 8 by way of two elongate bars 10 integrally formed on the upper surface of the housing member 4. Ram 8 is vertically moveable by any suitable drive means 9 associated with the press. The two bars 10 extend substantially parallel with respect to one another and define a U-shaped channel 12 for receiving the ram 8, the channel 12 facing in the opposite direction to the channel 6.

An inflatable tubular member 14 made of a flexible material such as rubber is received in the channel 6 and can be inflated to substantially fill the channel 6 as is shown in FIG. 1. An elongate strip 16 of flexible material, such as synthetic rubber, is positioned in the opening of the channel 6 and extends over the full length of the channel 6. The width of the strip is equal to or slightly less than the width a of the channel 6. The lower surface 17 of the strip 16 forms a planar pressing surface of the upper platen 2. The strip 16 and the tubular member 14 are retained in position in the opening of the channel 6 by means of a skirt 18 which extends over the full length of the channel 6. Longitudinal edges 20 of the skirt 18 are secured to sides 22 and 24 of the housing member 4.

The platen arrangement shown in FIG. 1 also includes a second, lower, fixed platen 26 which has a substantially rigid, metallic elongate housing member 28 having a substantially U-shaped cross-section defining a channel 30. The upper surface 32 of the member 28 forms a planar pressing surface of the lower platen 26. An electrical heating element 34 is retained in the channel 30 adjacent to the base thereof and is arranged to transfer heat to the housing member 28. The channel 30 also contains an insulating layer 36 of fibrous lagging material, such as mineral wool, which is arranged adjacent the heating element 34 to reduce flow of heat in the downward direction away from the pressing surface 32. The housing member 28 is supported by a frame member 38 of the press but is thermally insulated therefrom by a rigid layer of thermally-insulating material 40, such as a resin impregnated fabric.

A press incorporating the platen arrangement of FIG. 1 is schematically shown in FIG. 2 in which like parts are indicated by the same reference numerals. The press shown in FIG. 2 has a main C-shaped frame 42 mounted on a support bench 44. The upper movable member 8 is mounted on the frame 42 for movement with respect thereto. The movable member 8 supports the upper platen 2 as is shown in FIG. 1. The lower platen 26 is supported by the frame member 38 which is secured to a lower, elongate member 46 which is fixed to the main frame 42. A source 48 of compressed air is connected by a pipeline 50 to a regulating valve 52 and then by a pipeline 54 to the tubular member 14 of the upper platen 2. The source 48 is preferably operated by a pump (not shown).

The operation of the press will now be described when used in a vulcanization process to join two sheets of rubber or rubber-like material. It is to be understood that this process is described only by way of example, and the press may obviously have other applications.

The working gap between the pressing surfaces 17 and 32 of the upper and lower platens 2 and 26 of the press is first set by moving the upper member 8 and hence the platen 2 relative to the frame 42. The working gap is chosen in accordance with the thickness of the workpiece to be pressed. The heating element 34 of the lower platen 26 is switched on and allowed to heat the lower platen 26 to a predetermined temperature. The lower platen 26 is maintained at this predetermined temperature by means of a thermostat (not shown) associated with the heating element 34. Two sheets 56 and 58 of rubber or rubber-like material which are to be joined are then arranged so that the adjacent edges thereof are overlapped and a thin layer of uncured tape 60 is interposed between the overlapped edges to form a laminated joint area. The tape is a bonding tape of a material which is compatible with and of the same generic character as the material of the sheets to be joined. The laminated joint area is then arranged in the working gap between the two platens 2 and 26 and is supported on the pressing surface 32 of the lower platen 26. The regulating valve 52 is then opened so that compressed air from the source 48 is fed to the inflatable member 14 of the upper platen 2. The inflatable member 14 is thus inflated so that it imparts a pressure to the workpiece, that is the laminated joint area, by way of the pressing surface of the strip 16 which acts as a pressure transmitting member. The air pressure within the member 14 and hence the pressure applied to the workpiece is maintained at a predetermined value for a predetermined time determined in dependence upon the curing properties of the tape 60. At the end of this predetermined time the regulating valve 52 is closed, and the air pressure within the member 14 is relieved, to relieve the pressure applied to the workpiece. Suitable means (not shown), for example, a relief valve, is provided to relieve the air pressure within the inflatable member 14 as required. The sheets 56 and 58, which are now bonded together, are then removed from the press.

It will be seen that the pressure applied by the inflatable member 14 to the workpiece is a direct function of the pressure of the air fed to the member 14 and that there is no intervening mechanical linkage which could modify that pressure. It is therefore possible to accurately control the actual pressure applied to the workpiece. It is also possible to subject the workpiece to one or more pressure steps by increasing or decreasing the pressure in the inflatable member 14 as required. In additional, the pressure applied by the member 14 will be uniform over the whole area of the workpiece.

As described above the inflatable member 14 is inflated by compressed air. However, any pneumatic or hydraulic fluid may be used to inflate the member 14. Further, in the embodiment described the member 14 applies pressure by way of the strip 16 which has a planar pressing surface. However, the platens need not be confined to a flat configuration and the pressing surfaces of the platens may have complementary curvilinear or other shaped pressing surfaces if required. In addition, the pressing surface of the upper platen need not be formed on a pressure transmitting member as the strip 16 but could be integrally formed on a part of the surface of the inflatable member 14.

The platens and press of the invention have been described with particular reference to a vulcanization process for bonding sheets of rubber or rubber-like material together. Obviously the press may be used for all other types of pressing operations, for example, it may be used as a brake-press for forming sheet metal. The press of the invention is especially convenient and economical when a relatively large pressing area is required.

The platen of the invention has been described as supported on a press having a C-shaped main frame. However, the platen may be used with other types of presses having different frame configurations.

We claim:

1. A press comprising first and second platens mounted so as to define a working gap therebetween, at least said first platen comprising a housing having a recess defined therein, an inflatable member received within said recess, and a flexible pressure transmitting member having a pressure applying surface for applying pressure upon inflation of said inflatable member, said pressure transmitting member being retained in the opening of the recess and being mounted so as to be free to adapt to irregularities in a workpiece over its entire pressure applying surface.

2. A press as claimed in claim 1, wherein the housing is an elongate member and the recess is a substantially U-shaped channel extending over substantially the full length of the elongate member.

3. A press as claimed in claim 2, wherein said pressure transmitting member has a planar pressure applying surface which extends substantially over the full length of the channel and has a width substantially equal to or slightly less than the width of the opening of the channel.

4. A press as claimed in claim 2, wherein the pressure transmitting member is retained in the opening of the channel by means of a skirt, the longitudinal edges of which are secured to the longitudinally extending sides of said elongate member so that the skirt extends across the opening of the channel.

5. A press as claimed in claim 1, further comprising a source of compressed air and a regulating valve arranged between said source and the or each inflatable member.

6. A press as claimed in claim 1, wherein the platens are moveable relative to one another.

7. A press as claimed in claim 1, wherein the platens are supported on a frame, said first platen is moveable relative to said frame and said second platen is fixed relative to said frame.

8. A press as claimed in claim 7, wherein said fixed platen comprises a heating element for heating the pressing surface thereof.

9. A press as claimed in claim 7, wherein said frame is open at one side to permit a workpiece to be inserted between the platens from that side.

10. A press as claimed in claim 9, wherein said frame is C-shaped.

* * * * *